(12) United States Patent
Xue et al.

(10) Patent No.: US 12,021,741 B2
(45) Date of Patent: Jun. 25, 2024

(54) PACKET MEASUREMENT METHOD, DEVICE, AND SYSTEM

(71) Applicant: Huawei Technologies Co., Ltd., Shenzhen (CN)

(72) Inventors: Wei Xue, Dongguan (CN); Jinming Huang, Dongguan (CN); Weidong Shao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 39 days.

(21) Appl. No.: 17/527,455

(22) Filed: Nov. 16, 2021

(65) Prior Publication Data

US 2022/0078106 A1    Mar. 10, 2022

Related U.S. Application Data

(63) Continuation of application No. PCT/CN2020/078003, filed on Mar. 5, 2020.

(30) Foreign Application Priority Data

May 16, 2019   (CN) .................. 201910406320.X (51) Int. Cl.
*H04L 45/00* (2022.01)
*H04L 45/42* (2022.01)
*H04L 45/745* (2022.01)

(52) U.S. Cl.
CPC ............. *H04L 45/38* (2013.01); *H04L 45/42* (2013.01); *H04L 45/566* (2013.01); *H04L 45/745* (2013.01)

(58) Field of Classification Search
CPC .... H04L 45/566; H04L 45/745; H04L 43/026
See application file for complete search history.

(56) References Cited

U.S. PATENT DOCUMENTS

2009/0190575 A1    7/2009  Fukuyama et al.
2011/0243029 A1*  10/2011  Mack-Crane ....... H04L 43/0888
                                                 370/253
(Continued)

FOREIGN PATENT DOCUMENTS

CN    101826989 A    9/2010
CN    102624598 A    8/2012
(Continued)

OTHER PUBLICATIONS

Gandhi, R., Ed. et al., "Performance Measurement for Segment Routing Networks with MPLS Data Plane," draft-gandhi-spring-rfc6374-srpm-mpls-01, XP015132948, Spring Working Group Internet-Draft, May 15, 2019, 15 pages.

(Continued)

*Primary Examiner* — Jackie Zuniga Abad
(74) *Attorney, Agent, or Firm* — Conley Rose, P.C.

(57) ABSTRACT

A packet measurement method includes obtaining, by a network device, reverse measurement indication information that is used to indicate a request to measure a reverse packet flow of a first packet flow, after receiving the first packet flow, adding, by the network device, the reverse measurement indication information to a packet in the first packet flow, and sending, by the network device, the packet that is in the first packet flow and that carries the reverse measurement indication information. By adding the reverse measuring indication information to the packet in the first packet flow, the method indicates a request to another network device on the packet forwarding path to measure the reverse packet flow of the first packet flow. Measurement on bidirectional packet flows is implemented through one measurement deployment.

20 Claims, 6 Drawing Sheets

(56) References Cited

U.S. PATENT DOCUMENTS

| | | |
|---|---|---|
| 2011/0310727 A1* | 12/2011 | Guo .................... H04L 41/0631 |
| | | 370/216 |
| 2015/0263922 A1 | 9/2015 | Edsall et al. |
| 2015/0281028 A1 | 10/2015 | Akhter et al. |
| 2017/0026289 A1 | 1/2017 | Vinsel et al. |
| 2017/0111209 A1 | 4/2017 | Ward et al. |
| 2018/0278548 A1 | 9/2018 | Pignataro et al. |
| 2019/0230005 A1 | 7/2019 | Ao et al. |
| 2020/0007517 A1* | 1/2020 | Spahn ..................... H04L 45/38 |
| 2020/0084147 A1* | 3/2020 | Gandhi ................... H04L 41/40 |
| 2021/0153254 A1* | 5/2021 | Zhu ....................... H04W 76/11 |
| 2022/0021600 A1* | 1/2022 | Menon ................ H04L 41/5019 |

FOREIGN PATENT DOCUMENTS

| | | |
|---|---|---|
| CN | 102752128 A | 10/2012 |
| CN | 107872356 A | 4/2018 |
| CN | 109743340 A | 5/2019 |
| EP | 3896932 A1 | 10/2021 |
| JP | 2015162691 A | 9/2015 |
| WO | 2014046875 A1 | 3/2014 |

OTHER PUBLICATIONS

R. Gandhi, Ed., et al., "Performance Measurement in Segment Routing Networks with MPLS Data Plane," Internet-Draft, Jun. 9, 2018, 26 pages.

\* cited by examiner

PACKET MEASUREMENT METHOD, DEVICE, AND SYSTEM

CROSS-REFERENCE TO RELATED APPLICATIONS

This application is a continuation of International Patent Application No. PCT/CN2020/078003 filed on Mar. 5, 2020, which claims priority to Chinese Patent Application No. 201910406320.X filed on May 16, 2019. The disclosures of the aforementioned applications are hereby incorporated by reference in their entireties.

TECHNICAL FIELD

This disclosure relates to the field of communications technologies, and in particular, to a packet measurement method, a device, and a system.

BACKGROUND

In-band operation, administration, and maintenance (IOAM) is an in-band flow measurement method for a network transmission path status. In the method, an IOAM header including measurement information is added to each packet at an ingress node of a measurement domain, and the IOAM header is transmitted along with a packet flow. The IOAM header is updated at an intermediate node of a transmission path, and related information is added. An egress node of the measurement domain collects all IOAM headers and reports the IOAM headers to a centralized controller. The centralized controller analyzes reported data to obtain network quality. However, in this method, measurement deployment needs to be performed for each measurement domain, and one deployment is performed only for unidirectional traffic. If bidirectional traffic needs to be measured, two deployments need to be performed, causing heavy workload and great difficulty during implementation.

SUMMARY

Embodiments of this application provide a packet measurement method, a device, and a system, to resolve a problem of heavy workload and great difficulty during implementation caused by two deployments during measurement of bidirectional traffic.

According to a first aspect, a packet measurement method is provided. The method includes a network device that obtains reverse measurement indication information, where the reverse measurement indication information is used to indicate to measure a reverse packet flow of a first packet flow. After receiving the first packet flow, the network device adds the reverse measurement indication information to a packet in the first packet flow. The network device sends the packet carrying the reverse measurement indication information along a forwarding path of the first packet flow.

According to the foregoing method, the network device adds the reverse measurement indication information to the packet in the first packet flow, to indicate a network device that receives the packet, for example, a last node that measures the reverse packet flow of the first packet flow. One measurement deployment implements measurement on bidirectional packet flows, reduces workload of measurement deployment, and makes the measurement deployment easier.

In a possible design, the method further includes that the network device adds an identifier of the first packet flow to the packet at a first port, where the first port is a port at which the network device receives the first packet flow. The network device identifies the packet based on the identifier of the first packet flow at a second port, and measures the packet, where the second port is a port at which the network device sends the first packet flow. The identifier of the first packet flow is used to mark the to-be-measured first packet flow, and the to-be-measured packet is subsequently identified by using the identifier of the first packet flow. Compared with identification of the to-be-measured packet by using an Internet Protocol (IP) address, this can simplify a measurement packet identification process, shorten a processing time, and improve measurement efficiency.

In a possible design, the method further includes that the network device adds the reverse measurement indication information and the identifier of the first packet to a stack bottom label of a label stack of the packet at the second port. In a Multiprotocol Label Switching (MPLS) network, the label including the reverse measurement indication information and the identifier of the first packet flow is encapsulated at the bottom of an MPLS label stack. This does not affect that each network device on a packet transmission path performs packet forwarding according to a top label.

According to a second aspect, a packet measurement method is provided. The method includes a network device receives a first packet flow, where a packet in the first packet flow includes reverse measurement indication information. The network device measures a second packet flow based on an indication of the reverse measurement indication information, where the second packet flow is a reverse packet flow of the first packet flow.

By using the foregoing method, the network device parses the packet in the first packet flow to obtain the reverse measurement indication information, and measures the reverse packet flow of the first packet flow based on the indication of the reverse measurement indication information. Measurement on bidirectional packet flows is implemented through one measurement deployment, thereby reducing workload of the measurement deployment, and making the measurement deployment easier.

In a possible design, the method further includes that the network device adds an identifier of the second packet flow to a packet in the second packet flow at a second port, where the second port is a port at which the network device receives the second packet flow. The network device identifies the packet in the second packet flow based on the identifier of the second packet flow at a first port, and measures the packet in the second packet flow, where the first port is a port at which the network device sends the second packet flow. The identifier of the second packet flow is used, to mark the to-be-measured second packet flow, and subsequently identification of a to-be-measured packet is performed by using the identifier of the second packet flow. Compared with identification of the to-be-measured packet by using an IP address, this can simplify a measurement packet identification process, shorten a processing time, and improve measurement efficiency.

In a possible design, the method further includes that the network device adds the identifier of the second packet to a stack bottom label of a label stack of the packet in the second packet flow at the first port. In an MPLS network, the label including the identifier of the second packet flow is encapsulated at the bottom of an MPLS label stack. This does not affect that each network device on a packet transmission path performs packet forwarding according to a top label.

According to a third aspect, a packet measurement method is provided. The method includes a network device receives a packet in a first packet flow. The network device adds an identifier of the first packet flow to the packet at a first port, and measures the packet, where the first port is a port at which the network device receives the first packet flow. The network device identifies the packet based on the identifier of the first packet flow at a second port, and measures the packet, where the second port is a port at which the network device sends the first packet flow.

By using the foregoing method, the identifier of the first packet flow is used, to mark the to-be-measured first packet flow, and subsequently identification of a to-be-measured packet is performed by using the identifier of the first packet flow. Compared with identification of the to-be-measured packet by using an IP address, this can simplify a measurement packet identification process, shorten a processing time, and improve measurement efficiency.

In a possible design, the method further includes that the network device adds the identifier of the first packet to a stack bottom label of a label stack of the packet at the second port. In an MPLS network, the label including the identifier of the second packet flow is encapsulated at the bottom of an MPLS label stack. This does not affect that each network device on a packet transmission path performs packet forwarding according to a top label.

In a possible design, the method further includes that the network device generates first ingress statistical information at the first port. The network device generates first egress statistical information at the second port. The network device sends the first ingress statistical information and the first egress statistical information to a controller. The network device separately performs packet measurement on the two ports, to obtain two pieces of measurement data. This helps improve measurement accuracy. For example, in packet loss measurement, a packet loss status inside the network device can be found by comparing packet count values at the two ports.

In a possible design, the method further includes that the network device sends the identifier of the first packet flow and identification information of the network device to the controller, where the identifier of the first packet flow is used to indicate the controller to calculate a measurement result of the first packet flow on the network device based on the first ingress statistical information and the first egress statistical information. Each network device on the packet transmission path may report, to the controller, statistical information generated by performing packet measurement. A hop-by-hop reporting mode of the statistical information reduces an amount of reported data, facilitating long-time measurement of packet flows. A reported statistical packet includes an identifier of a packet flow and identification information of the network device, so that the controller can accurately calculate a packet transmission status on each network device, thereby facilitating network maintenance.

According to a fourth aspect, a network device is provided, to perform the method performed by the network device in any one of the first aspect or the possible implementations of the first aspect. Further, the network device includes units configured to perform the method in any one of the first aspect or the possible implementations of the first aspect.

According to a fifth aspect, a network device is provided, to perform the method performed by the network device in any one of the second aspect or the possible implementations of the second aspect. Further, the network device includes units configured to perform the method in any one of the second aspect or the possible implementations of the second aspect.

According to a sixth aspect, a network device is provided, to perform the method performed by the network device in any one of the third aspect or the possible implementations of the third aspect. Further, the network device includes units configured to perform the method in any one of the third aspect or the possible implementations of the third aspect.

According to a seventh aspect, a network device is provided. The network device includes a processor, a network interface, and a memory. The network interface may be a transceiver. The memory may be configured to store program code. The processor is configured to invoke the program code in the memory to perform the method in any one of the first aspect or the possible implementations of the first aspect.

According to an eighth aspect, a network device is provided. The network device includes a processor, a network interface, and a memory. The network interface may be a transceiver. The memory may be configured to store program code. The processor is configured to invoke the program code in the memory to perform the method in any one of the second aspect or the possible implementations of the second aspect.

According to a ninth aspect, a network device is provided. The network device includes a processor, a network interface, and a memory. The network interface may be a transceiver. The memory may be configured to store program code. The processor is configured to invoke the program code in the memory to perform the method in any one of the third aspect or the possible implementations of the third aspect.

According to a tenth aspect, a network system is provided. The system includes the network device provided in the fourth aspect and the network device provided in the fifth aspect, or the system includes the network device provided in the seventh aspect and the network device provided in the eighth aspect.

According to a tenth aspect, a computer storage medium is provided. The computer storage medium is configured to store computer software instructions used by the foregoing network device, and the computer storage medium includes a program used to perform the foregoing aspects.

According to an eleventh aspect, a computer program product including computer program instructions is provided. When the computer program product is run on a network device, the network device is enabled to perform the method provided in the first aspect, the second aspect, the third aspect, any one of the possible implementations of the first aspect, any one of the possible implementations of the second aspect, or any one of the possible implementations of the third aspect.

DESCRIPTION OF EMBODIMENTS

The following describes embodiments of this application with reference to the accompanying drawings.

Figure 1:
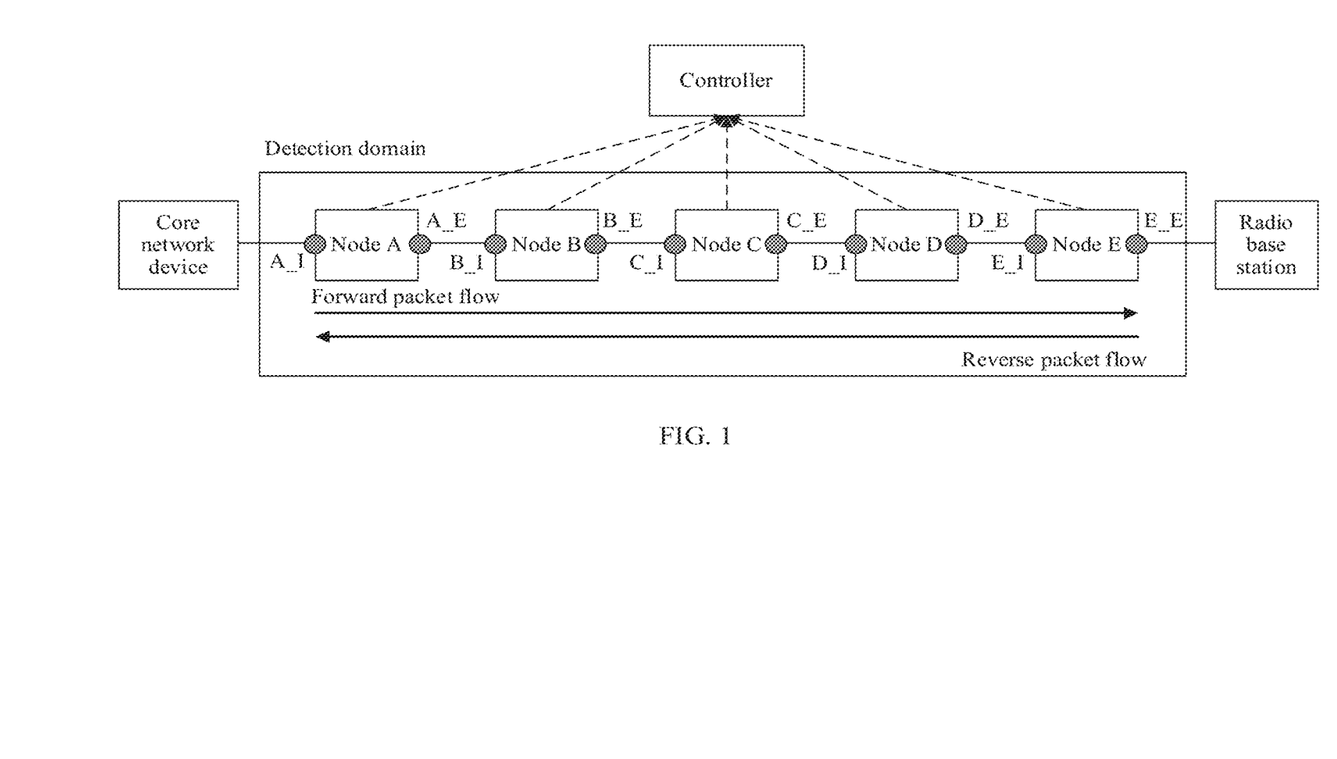
FIG. 1 is a schematic diagram of a network scenario according to an embodiment of the present disclosure.

FIG. 1 shows a possible application scenario according to an embodiment of this application. The application scenario includes a layer 3 (L3) virtual private network (VPN) (L3VPN) that is based on MPLS. The MPLS L3VPN features flexible networking manner and good scalability, can conveniently support MPLS quality of service (QoS) and MPLS traffic engineering (TE), and is generally applied to a service provider network. The network includes a controller and a plurality of nodes. The plurality of nodes is connected by using network links, and are configured to transmit a packet flow. As shown in FIG. 1, an external node 1, a node A, a node B, a node C, a node D, a node E, and an external node 2 are sequentially connected by using network links. For example, the node A and the node E may be provider edge (PE) devices in a network, and are respectively directly connected to the external node 1 and the external node 2 of a customer edge (CE) device. The external node 1 may be a core network device, and the external node 2 may be a radio base station. Packet flows in different directions can be transmitted in the network. For example, a first packet flow is transmitted from the node A to the node E, and a second packet flow is transmitted from the node E to the node A. Directions of the two packet flows are opposite. The first packet flow may be defined as a forward packet flow, and the second packet flow is a reverse packet flow relative to the forward packet flow.

In this embodiment of this application, a status of a network transmission path in the MPLS L3VPN is measured by using an in-band flow information telemetry (IFIT) method. In this method, by performing measurement on a packet flow actually transmitted in the network, and collecting and analyzing measurement data, network transmission path status information can be obtained.

In the method, a measurement domain for a to-be-measured packet flow is first determined. The measurement domain is determined by the controller based on a transmission path of the to-be-measured packet flow. In a possible implementation, a network management device or a user equipment sends device information of the transmission path of the to-be-measured packet flow to the controller, where the device information includes a first node device identifier and a last node device identifier of the transmission path of the to-be-measured packet flow. The controller may receive the device information through, for example, a northbound interface (NBI). In another possible implementation, the controller determines the first node device identifier and the last node device identifier of the transmission path of the to-be-measured packet flow according to a preset control policy. The controller may obtain a topology of a network that includes a plurality of network devices. Therefore, the controller determines the first node device identifier and the last node device identifier of the transmission path of the to-be-measured packet flow based on the topology of the network. For example, the preset control policy is to perform measurement information collection and performance measurement on a transmission path between forwarding devices included in a data center (DC). The controller determines the first node device identifier and the last node device identifier of the transmission path of the to-be-measured packet flow based on a topology of the DC. The controller determines the measurement domain based on the first node device identifier and the last node device identifier, where the measurement domain includes all network devices on the transmission path of the to-be-measured packet flow. An ingress node device of the measurement domain is the first node device of the transmission path, and an egress node device of the measurement domain is the last node device of the transmission path. After the measurement domain is determined, measurement deployment needs to be performed at the ingress node of the measurement domain, so that each node on the transmission path starts to detect the packet flow.

As shown in FIG. 1, for the first packet flow, a transmission path of the first packet flow is that the first packet flow is transmitted from the node A to the node E via the node B, the node C, and the node D. A corresponding measurement domain includes the node A, the node B, the node C, the node D, and the node E. The node A is an ingress node of the measurement domain, and the node E is an egress node of the measurement domain. For the second packet flow, the second packet flow is a reverse packet flow of the first packet flow. A measurement domain for the second packet flow also includes the node A, the node B, the node C, the node D, and the node E. In this case, the node E is an ingress node of the measurement domain, and the node A is an egress node of the measurement domain. For measurement of the first packet flow, the measurement deployment needs to be performed at the node A, and for measurement of the second packet flow, the measurement deployment needs to be performed at the node E. It can be learned that the two measurement deployments are required for two packet flows in opposite directions. However, efficiency is relatively low when the measurement deployment is separately performed on two sides, and there may be a relatively large difference in work difficulty. With reference to the application scenario shown in FIG. 1, the node A and the node E may be PEs, the node A is connected to the core network device, and the node E is connected to the radio base station. A core network is usually connected to a plurality of radio base stations. In an example in which one core network is connected to 3000 radio base stations, the measurement deployment at the node E may need to be performed on a large quantity of distributed devices, and therefore, work is difficult.

This embodiment of this application provides a packet measurement method, and a network node and a system that are according to the method. Principles of resolving problems by the method, the network node, and the system are similar. Therefore, for the embodiments of the method, the network node, and the system, refer to each other, and same or similar content is not described.

Figure 2:
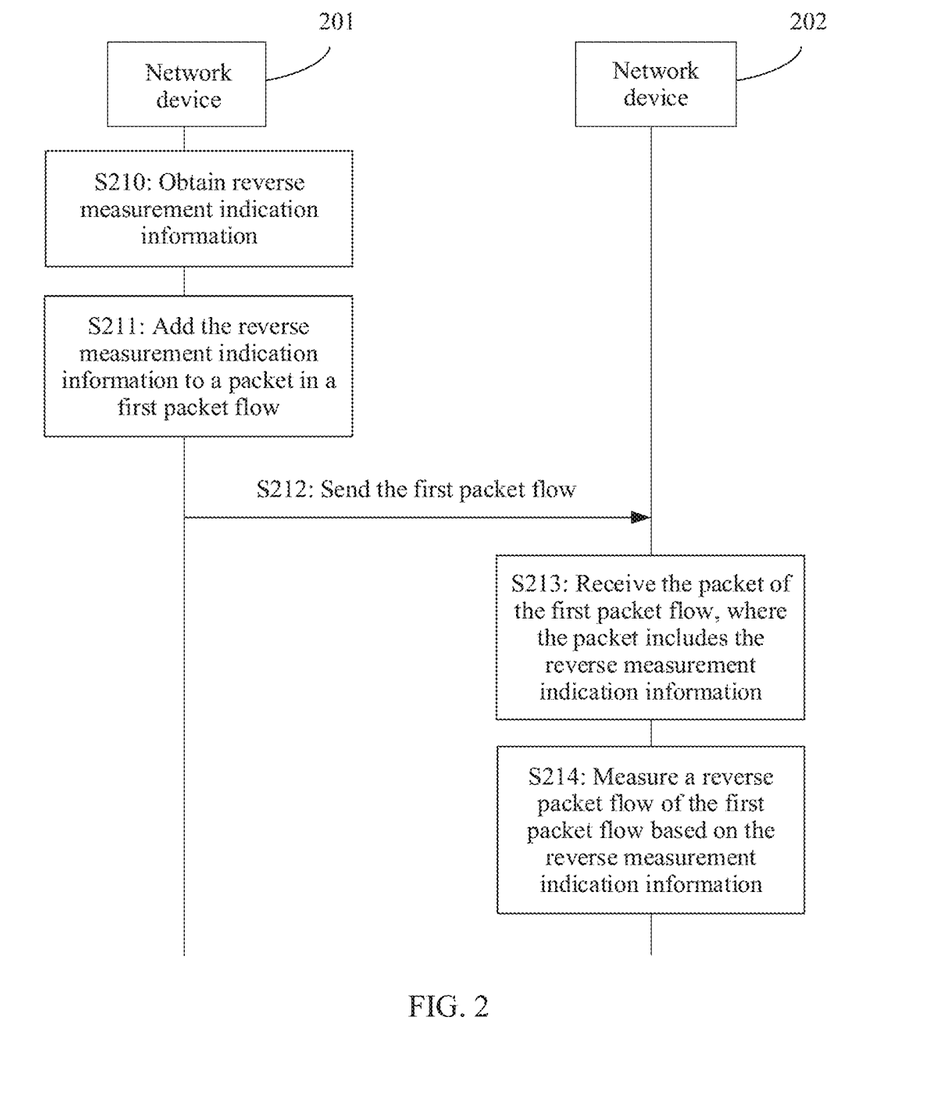
FIG. 2 is a flowchart of a packet measurement method according to an embodiment of the present disclosure.

Refer to FIG. 2. Embodiment 1 of this application provides a packet measurement method. Reverse measurement indication information is added to measurement information carried in a forward packet flow, to indicate an egress node of a measurement domain for the forward packet flow to automatically generate a reverse measurement rule, so as to continue to measure a reverse packet flow. In this way, measurement on bidirectional traffic is implemented through one measurement deployment, thereby improving deployment efficiency and making deployment easier. The method includes the following content.

S210. A network device 201 obtains the reverse measurement indication information, where the reverse measurement indication information is used to indicate to measure a reverse packet flow of a first packet flow.

The network device 201 and a network device 202 may be two PE devices. For example, the network device 201 and the network device 202 may be respectively the node A and the node E in FIG. 1. The first packet flow is a packet flow transmitted from the node A to the node E, that is, a forward packet flow. The node A may also measure the first packet flow. The node A is an ingress node of a measurement domain for the first packet flow, and the node E is an egress node of the measurement domain for the first packet flow.

In an example, the node A may receive control information sent by a controller, and generate the reverse measurement indication information based on the control information. The reverse measurement indication information is used to indicate to measure the reverse packet flow of the first packet flow.

In an example, a source IP address of the reverse packet flow of the first packet flow is a destination IP address of the first packet flow, and a destination IP address of the reverse packet flow is a source IP address of the first packet flow.

S211: The network device 201 adds the reverse measurement indication information to a packet in the first packet flow.

In an example, the network device 201 may measure the packet in the first packet flow.

S212: The network device 201 sends the packet that is in the first packet flow and that carries the reverse measurement indication information to the network device 202.

In an example, that the network device 201 sends the packet in the first packet flow to the network device 202 may mean that the packet is sent by the network device 201, forwarded by several other network devices, and finally arrives at the network device 202. For example, the packet is sent by the node A, forwarded by the node B, the node C, and the node D, and finally arrives at the node E. In addition, the network device 201 and the network device 202 may also be directly connected, that is, there is no other node between the network device 201 and the network device 202.

S213: The network device 202 receives the first packet flow sent by the network device 201, where the packet in the first packet flow includes the reverse measurement indication information.

S214: The network device 202 measures a second packet flow based on the reverse measurement indication information, where the second packet flow is the reverse packet flow of the first packet flow.

An example is used for description with reference to the application scenario shown in FIG. 1. The first packet flow is the packet flow transmitted from the node A to the node E, that is, the forward packet flow. The measurement domain for the first packet flow includes the node A, the node B, the node C, the node D, and the node E. A first network device is the node A, is also the ingress node of the measurement domain, and may be connected to the core network device. A second network device is the node E, is also the egress node of the measurement domain, and may be connected to the radio base station. The node A receives the control information sent by the controller, and generates the reverse measurement indication information based on the control information. The node A adds the reverse measurement indication information to the packet in the first packet flow, and sends, to the node E, the packet that is in the first packet flow and that carries the reverse measurement indication information. The packet in the first packet flow finally arrives at the node E via the node B, the node C, and the node D. After receiving the packet, the node E obtains, through parsing, the reverse measurement indication information in the packet, and measures the reverse packet flow of the first packet flow based on an indication of the reverse measurement indication information. The reverse packet flow of the first packet flow is a packet flow transmitted from the node A to the node E, that is, the second packet flow. Therefore, two measurements of the forward packet flow and the reverse packet flow can be implemented by performing one deployment on the ingress node of the measurement domain for the forward packet flow. In particular, the ingress node E of the measurement domain for the reverse packet flow is a PE connected to the radio base station, and in an actual network environment, there are a large quantity of nodes E that are dispersed. The foregoing method can greatly reduce workload of measurement deployment and make the measurement deployment easier.

Figure 3:
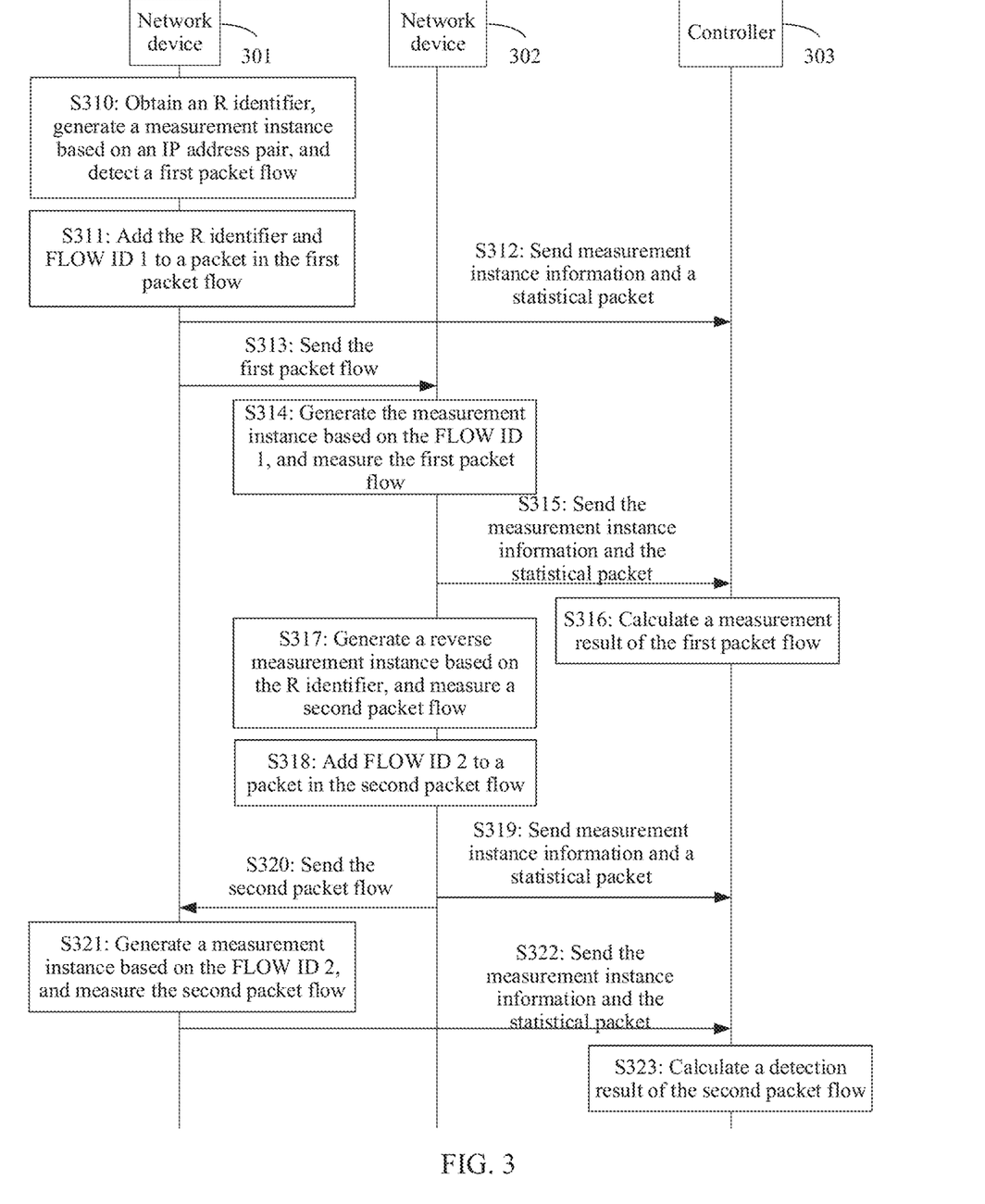
FIG. 3 is a flowchart of a packet measurement method according to an embodiment of the present disclosure.

Refer to FIG. 3. Embodiment 2 of this application provides a packet measurement method. With reference to the application scenario shown in FIG. 1, a network device 301 and a network device 302 may be two PE devices, that is, the network device 301 and the network device 302 are respectively an ingress node and an egress node of a measurement domain. A controller 303 is a controller in a network. For example, the network device 301 and the network device 302 may be respectively the node A and the node E in FIG. 1. The node A is connected to a core network device. The node E is connected to a radio base station. A first packet flow is a packet flow transmitted from the node A to the node E, that is, a forward packet flow. The node A is an ingress node of a measurement domain for the first packet flow, and the node E is an egress node of the measurement domain for the first packet flow. A second packet flow is a reverse packet flow of the first packet flow, that is, a packet flow that is transmitted from the node E to the node A. A transmission path of the first packet flow or the second packet flow may further include more nodes, located between the node A and the node E. Correspondingly, the measurement domain for the first packet flow or a measurement domain for the second packet flow may further include more nodes. These changes are within a conventional expectation of a person skilled in the art. Each node includes two ports. For example, the node A includes a first port A_I and a second port A_E. For the first packet flow, the port A_I is a receive port, and the port A_E is a transmit port. For the second packet flow, the port A_E is a receive port, and the port A_I is a transmit port. The node B includes a port B_I and a port B_E, the node C includes a port C_I and a port C_E, the node D includes a port D_I and a port D_E, and the node E includes a port E_I and a port E_E. A manner of sending and receiving a packet flow by each of the node B and the node E is the same as that by the node A. The measurement process includes the following steps.

S310: The network device 301 obtains reverse measurement indication information, generates a measurement instance for the first packet flow based on an IP address pair, and measures the first packet flow.

With reference to the application scenario shown in FIG. 1, the node A obtains the reverse measurement indication information, for example, an R identifier. The R identifier is used to indicate to measure the reverse packet flow of the first packet flow. For example, the R identifier may indicate the egress node (that is, the node E) of the measurement domain to measure the reverse packet flow of the first packet flow, or indicate an intermediate node (that is, the node B, the node C, or the node D) of the measurement domain to measure the reverse packet flow of the first packet flow, or indicate the ingress node (that is, the node A) of the measurement domain to measure the reverse packet flow of the first packet flow.

In this embodiment of this application, each measurement instance may indicate one measurement performed on a packet flow at a corresponding measurement point. For each node in the measurement domain, one measurement instance may be generated in the node, or two measurement instances may be separately generated at two ports. For example, the node A may generate a measurement instance A1. For example, the node A may respectively generate two measurement instances, a measurement instance A_I1 and a measurement instance A_E1, at the port A_I and the port A_E. That is, packet measurement is separately performed at the port A_I and the port A_E. This helps improve measurement accuracy. For example, in packet loss measurement, a packet loss status inside the network device can be found by comparing packet count values at the two ports.

In an example, a first IP address pair includes a first source IP address and a first destination IP address. The first source IP address is a source IP address of the first packet flow, and the first destination IP address is a destination IP address of the first packet flow. For example, the first IP address pair may be directly delivered by the controller by using the control information. For example, the first IP address pair may be obtained by the node A by extracting a source IP address and a destination IP address of a packet based on an instruction of the controller. With reference to the application scenario shown in FIG. 1, the measurement instance A1 generated by the node A includes the first IP address pair. The node A identifies a received packet by using the first IP address pair. For a packet that matches the first IP address pair, it is considered that the packet belongs to a to-be-measured packet flow, that is, a packet in the first packet flow, and measurement is performed on the packet.

In an example, the network device 302 may further generate a measurement instance based on a 5-tuple. The 5-tuple includes a source IP address, a source port, a destination IP address, a destination port, and a transport layer protocol number. With reference to the application scenario shown in FIG. 1, the measurement instance A1 generated by the node A includes the source IP address, the source port, the destination IP address, the destination port, and the transport layer protocol number in the 5-tuple. When a source IP address, a source port, a destination IP address, a destination port, and a transport layer protocol number of a packet match the source IP address, the source port, the destination IP address, the destination port, and the transport layer protocol number in the measurement instance, the node A considers the packet as a to-be-measured packet.

In an example, the measurement instance for the first packet flow further includes an identifier of the first packet flow. In other words, the measurement instance establishes a correspondence between the identifier of the first packet flow and the first IP address pair. The identifier of the first packet flow is unique in the network, and is used to identify the first packet flow. For example, the identifier of the first packet flow is FLOW ID 1. For example, the identifier of the first packet flow may be in a format of a network device identifier plus sequence number information.

S311: The network device 301 adds the reverse measurement indication information and the identifier of the first packet flow to the packet in the first packet flow.

With reference to the application scenario shown in FIG. 1, after generating the measurement instance A1, the node A further adds the reverse measurement indication information and the identifier of the first packet flow to the packet in the first packet flow. The packet in the first packet flow is transmitted to the node E. The node E parses the received packet in the first packet flow, and obtains the reverse measurement indication information, so that the node E may measure the reverse packet flow of the first packet flow based on the reverse measurement indication information.

In an example, the identifier of the first packet flow may be obtained from the measurement instance. For example, the node A may extract the FLOW ID 1 from the measurement instance A1, and add the FLOW ID 1 to the packet in the first packet flow.

In an example, the network device 301 adds the identifier of the first packet flow to the packet in the first packet flow at a receive port, identifies the packet based on the identifier of the first packet flow at a transmit port, and measures the packet. The receive port is a port at which the network device 301 receives the first packet flow, and the transmit port is a port at which the network device 301 sends the first packet flow. With reference to the application scenario shown in FIG. 1, the measurement instance A_I1 generated by the node A at the port A_I includes the first IP address pair. The node A identifies the received packet at the port A_I by using the first IP address pair. For the packet that matches the first IP address pair, it is considered that the packet belongs to the to-be-measured packet flow, that is, the packet in the first packet flow, and measurement is performed on the packet. The node A adds the FLOW ID 1 to the packet in the first packet flow at the port A_I. The packet arrives at the port A_E. At the port A_E, the node A obtains, through parsing, the FLOW ID 1 carried in the packet, and generates the measurement instance A_E1 based on the FLOW ID 1. For a packet subsequently received at the port A_E, if the packet includes the FLOW ID 1, it is considered that the packet belongs to the to-be-measured first packet flow, and measurement is performed on the packet. It can be learned that after the identifier of the first packet flow is added to the packet in the first packet flow at a receive port of an ingress node on the packet transmission path, a transmit port of the ingress node may identify a to-be-measured packet by using the identifier of the first packet flow. If the first packet flow does not carry the FLOW ID 1, the measurement instance may also be generated at the transmit port based on the IP address pair. Correspondingly, the measurement instance may identify, based on the IP address pair of a packet, whether to detect the packet. Compared with the foregoing manner of identifying the to-be-measured packet by using the IP address pair, the manner of identifying the packet by using the FLOW ID 1 simplifies a measurement packet identification process, shortens a processing time, and improves measurement efficiency.

S312: The network device 301 sends measurement instance information and a statistical packet to the controller 303.

The measurement instance information may include the identifier of the first packet flow and network device information. The network device information may be identification information of a node or identification information of a port. When the measurement instance performs packet identification by using the first IP address pair, the measurement instance information may further include the first IP address pair. For example, the node A generates the measurement instance A1, and the measurement instance A1 includes the first IP address pair, the FLOW ID 1, and identification information of the node A. For example, the node A generates the measurement instance A_E1 at the transmit port A_E for the first packet flow, and the measurement instance A_E1 includes the FLOW ID 1, and identification information of the port A_E.

The statistical packet includes measurement data obtained by the network device 301 by detecting the first packet flow. There may be one or more pieces of measurement data, and a quantity of the one or more pieces of measurement data correspond to a quantity of measurement instances. For example, when the node A generates one measurement instance A1 for the first packet flow, the node A obtains one piece of measurement data by measuring the first packet flow. This is corresponding to the one measurement instance A1. When the node A respectively generates the measurement instance A_I1 and the measurement instance A_E1 at the receive port and the transmit port for the first packet flow, the node A obtains two pieces of the measurement data by detecting the first packet flow. This is corresponding to the measurement instances A_I1 and A_E1.

Optionally, the statistical packet further includes the measurement instance information.

Optionally, the network device 301 sends measurement instance information and statistical packets of all measurement instances in the network device to the controller. Optionally, the network device 301 separately sends measurement instance information and a statistical packet to the controller for each measurement instance. For example, after sending measurement instance information and a statistical packet of the measurement instance A_I1 to the controller, the node A sends measurement instance information and a statistical packet of the measurement instance A_E1 to the controller.

Optionally, the measurement instance information and the statistical packet of each measurement instance may be sent to the controller by one sending operation. Optionally, the measurement instance information and the statistical packet of each measurement instance may be sent to the controller by two sending operations. For example, after generating the measurement instance A1, the node A sends the measurement instance information to the controller. The node A performs packet measurement on the first packet flow, generates the statistical packet based on measurement data, and sends the statistical packet to the controller. In addition to the packet measurement data, the statistical packet may further include the FLOW ID 1 and information of the node A.

S313: The network device 301 sends the packet in the first packet flow.

In an example, the network device 301 encapsulates, at the transmit port for the first packet flow, the reverse measurement indication information and the identifier of the first packet flow in a bottom of an MPLS label stack of the packet in the first packet flow for sending. For example, the node A adds the R identifier and the FLOW ID 1 to the packet in the first packet flow at the receive port A_I for the first packet flow, and the node A further encapsulates the R identifier and the FLOW ID 1 into the bottom of the MPLS label stack of the packet at the transmit port A_E for the first packet flow. In an MPLS network, a label including the reverse measurement indication information and the identifier of the first packet flow is encapsulated at the bottom of the MPLS label stack. This does not affect that each network device on a packet transmission path performs packet forwarding according to a top label.

S314: The network device 302 generates a measurement instance based on the identifier that is of the first packet flow and that is carried in the packet in the first packet flow, and measures the packet. Optionally, the network device 302 may generate one or two measurement instances for the first packet flow, and measures the packet. Optionally, the network device 302 may separately generate one measurement instance at the receive port and the transmit port for the first packet flow. Optionally, the network device 302 may generate the measurement instance based on the identifier that is of the first packet flow and that is carried in the packet in the first packet flow. Optionally, the network device may identify a packet in a to-be-measured first packet flow based on the identifier of the first packet flow. Optionally, each intermediate node searches the identifier of the first packet flow in an MPLS label stack of the packet. For example, the node E obtains, through parsing, that a label stack of the packet in the first packet flow includes the FLOW ID 1, and generates a measurement instance E1 based on the FLOW ID 1. The FLOW ID 1 is added by the node A to the packet in the first packet flow. For a packet subsequently received by the node E, if a label stack of the packet includes the FLOW ID 1, it is considered that the packet belongs to the to-be-measured first packet flow, so that measurement is performed on the packet. It can be learned that after the identifier of the first packet flow is added to the packet in the first packet flow at the ingress node on the packet transmission path, a subsequent node on the packet transmission path may identify a to-be-measured packet by using the identifier of the first packet flow. If the first packet flow does not carry the FLOW ID 1, the network device 302 may also generate the measurement instance based on the IP address pair. Correspondingly, the measurement instance may identify, based on the IP address pair of the packet, whether to detect the packet. Compared with the foregoing manner of identifying the to-be-measured packet by using the IP address pair, the manner of using the FLOW ID 1 simplifies a measurement packet identification process, shortens a processing time, and improves measurement efficiency.

S315: The network device 302 sends measurement instance information and a statistical packet to the controller 303. This step may be performed in step S312.

After detecting the packet, the network device 302 sends the packet in the first packet flow.

Optionally, the network device 302 removes the identifier of the first packet flow and the reverse measurement indication information that are carried in the packet in the first packet flow, and continues to send, to an external node, for example, the radio base station, the packet from which the identifier of the first packet flow and the reverse measurement indication information are removed.

S316: The controller 303 receives measurement instance information and statistical packets that are sent by the network device 301 and the network device 302, calculates a measurement result for the first packet flow based on the packet measurement data, and restores network status information in the transmission path of the first packet flow based on the first IP address pair, the identifier of the first packet flow, and node information.

In an example, the controller 303 may calculate the measurement result after receiving all measurement instance information and statistical packets that are for the first packet flow and that are sent by the network device 301 and the network device 302. In other words, step S316 may be performed only once for the first packet flow.

In an example, the controller 303 may separately calculate the measurement result after receiving the measurement instance information and the statistical packets that are for the first packet flow and that are sent by the network device 301 or the network device 302. In other words, step S316 may be performed for a plurality of times for the first packet flow.

S317: The network device 302 generates a measurement instance for the second packet flow based on an indication of the reverse measurement indication information in the packet in the first packet flow, and measures the second packet flow, where the second packet flow is the reverse packet flow of the first packet flow.

In an example, the measurement instance that is for the second packet flow and that is generated by the network device 302 based on the reverse measurement indication information may include a second IP address pair. The second IP address pair includes a second source IP address and a second destination IP address. The second source IP address is the destination IP address of the first packet flow, and the second destination IP address is the source IP address of the first packet flow. The network device 302 identifies a received packet by using the second IP address pair. For a packet that matches the second IP address pair, it is considered that the packet belongs to packets in a to-be-measured second packet flow, and measurement is performed on the packet. For example, the node E receives a packet in the first packet flow, and obtains, through parsing, the reverse measurement indication information at the bottom of the MPLS label stack of the packet, for example, the R identifier. The node E exchanges the source IP address and the destination IP address of the packet in the first packet flow, to generate the second IP address pair. The node E generates the reverse packet flow for the first packet flow, that is, the measurement instance of the second packet flow. The node E identifies the received packet by using the second IP address pair. For a packet that matches the second IP address pair, it is considered that the packet belongs to the packets in the to-be-measured second packet flow, and measurement is performed on the packet.

A measurement process for the second packet flow is similar to a measurement process for the first packet flow, and descriptions of the measurement process for the first packet flow are also applicable to the second packet flow. This falls within the expectation of a person skilled in the art.

In an example, the measurement instance for the second packet flow further includes an identifier of the second packet flow. In other words, the measurement instance establishes a correspondence between the identifier of the second packet flow and the second IP address pair. The identifier of the second packet flow is unique in the entire network, and is used to identify the second packet flow. For example, the identifier of the second packet flow is FLOW ID 2. For example, the identifier of the second packet flow may be in a format of a network device identifier plus sequence number information.

S318: The network device 302 adds the identifier of the second packet flow to a packet in the second packet flow.

In an example, the network device 302 adds the identifier of the first packet flow to the packet in the first packet flow at a receive port, identifies the packet based on the identifier of the first packet flow at a transmit port, and measures the packet. The receive port is a port at which the network device 302 receives the first packet flow, and the transmit port is a port at which the network device 302 sends the first packet flow.

For a specific process of step S318, refer to the descriptions of step S311.

S319. The network device 302 sends measurement instance information and a statistical packet to the controller 303.

For a specific process of step S319, refer to the descriptions of step S312.

S320: A network device 302 sends the packet in the second packet flow.

For a specific process of step S320, refer to the descriptions of step S313.

S321. The network device 301 generates a measurement instance based on the identifier that is of the second packet flow and that is carried in the packet in the second packet flow, and measures the packet.

For a specific process of step S321, refer to the descriptions of step S314.

It should be noted that after the identifier of the second packet flow is added to the packet in the second packet flow at an ingress node, that is, the network device 302, on a packet transmission path of the packet in the second packet, a subsequent node on the packet transmission path may identify a to-be-measured packet by using the identifier of the second packet flow. If the second packet flow does not carry the FLOW ID 2, the network device 301 may also generate the measurement instance based on the IP address pair. Correspondingly, the measurement instance may identify, based on the IP address pair of the packet, whether to measure the packet. Compared with the foregoing manner of identifying the to-be-measured packet by using the IP address pair, the manner of identifying the packet by using the FLOW ID 2 simplifies a measurement packet identification process, shortens a processing time, and improves measurement efficiency.

S322: The network device 301 sends measurement instance information and a statistical packet to the controller 303.

For a specific process of step S322, refer to the descriptions of step S315.

After measuring the packet, the network device 301 sends the packet.

Optionally, the network device 301 removes the identifier of the second packet flow carried in the packet in the second packet flow, and continues to send, to an external node, for example, the core network device, the packet from which the identifier of the second packet flow is removed.

S323: The controller 303 receives measurement instance information and statistical packets that are sent by the network device 302 and the network device 301, calculates a measurement result based on the packet measurement data, and restores network status information in the transmission path of the second packet flow based on the second IP address pair, the identifier of the second packet flow, and node information.

For a specific process of step S323, refer to the descriptions of step S316.

In an example, for each node, a step of sending the measurement instance information and the statistical packet and a step of sending the first packet flow or the second packet flow may be performed in any sequence. For example, the measurement instance information and the statistical packet may be first sent, the first packet flow or the second packet flow may be first sent, or the first packet flow or the second packet flow may be sent at the same time when the measurement instance information and the statistical packet are sent. Refer to FIG. 3. S312 and S313, and S319 and S320 may be performed in any sequence.

In an example, the method may also relate to one or more intermediate nodes of the network. At each intermediate node, one or two measurement instances may be generated for the first packet flow, and the packet measurement may be performed. Optionally, at each intermediate node, the measurement instance may be generated based on the identifier that is of the first packet flow and that is carried in the packet in the first packet flow. Optionally, at each intermediate node, the packet in the to-be-measured first packet flow may be identified based on the identifier of the first packet flow. Optionally, each intermediate node searches the MPLS label stack of the packet for the identifier of the first packet flow. Optionally, each intermediate node also sends the measurement instance information and the statistical packet to the controller. With reference to the application scenario shown in FIG. 1, the one or more intermediate nodes may be the node B, the node C, or the node D. For example, the node B obtains, through parsing, that the label stack of the packet in the first packet flow includes the FLOW ID 1 at the port B_I, and generates a measurement instance B_I1 based on the FLOW ID 1. The FLOW ID 1 is added by the node A to the packet in the first packet flow. For a packet subsequently received at the port B_I, if a label stack of the packet includes the FLOW ID 1, it is considered that the packet belongs to the to-be-measured first packet flow, so that measurement is performed on the packet. The node B obtains, through parsing, that the label stack of the packet in the first packet flow includes the FLOW ID 1 at the port B_E, and generates a measurement instance B_E1 based on the FLOW ID 1. For a packet subsequently received at the port B_E, if a label stack of the packet includes the FLOW ID 1, it is considered that the packet belongs to the to-be-measured first packet flow, so that measurement is performed on the packet. Content and a sending process of measurement instance information and a statistical packet at the node B are similar to those at the node A. Similar operations are also performed at the node C and the node D. When the measurement domain further includes more intermediate nodes, these intermediate nodes also perform similar operations.

In an example, the measurement domain may include only one node, and the node is both an ingress node and an egress node. For example, the measurement domain may include only the node A. For each packet flow, one measurement instance may be generated at the node A, or two measurement instances may be generated at the two ports. For example, the node A may respectively generate two measurement instances, the measurement instance A_I1 and the measurement instance A_E1, at the port A_I and the port A_E. The measurement instance A_I1 includes the first IP address pair. The node A identifies a received packet by using the first IP address pair at the port A_I. The node A generates, at the port A_I, the first measurement information that includes the R identifier and the FLOW ID 1, and adds the first measurement indication information to the packet in the first packet flow. The packet arrives at the port A_E. The measurement instance A_E1 is generated at the port A_E based on the FLOW ID 1. In addition, a reverse measurement instance A_E2 for the second packet flow is generated at the port A_E based on the R identifier. The reverse measurement instance A_E2 includes the second IP address pair. Further, the node A exchanges the source IP address and the destination IP address of the packet in the first packet flow, to generate the second IP address pair. In addition, the received packet is identified by using the second IP address pair at the port A_E. For a packet that matches the second IP address pair, it is considered that the packet belongs to the packets in the to-be-measured second packet flow, and measurement is performed on the packet. The node A generates, at the port A_E, second measurement information that includes the FLOW ID 2, and adds the second measurement indication information to the packet in the second packet flow. The packet in the second packet flow arrives at the port A_I. The measurement instance A_I2 is generated at the port A_I based on the FLOW ID 2. For another specific measurement process, refer to the descriptions of related steps in FIG. 3 or FIG. 4.

Figure 4:
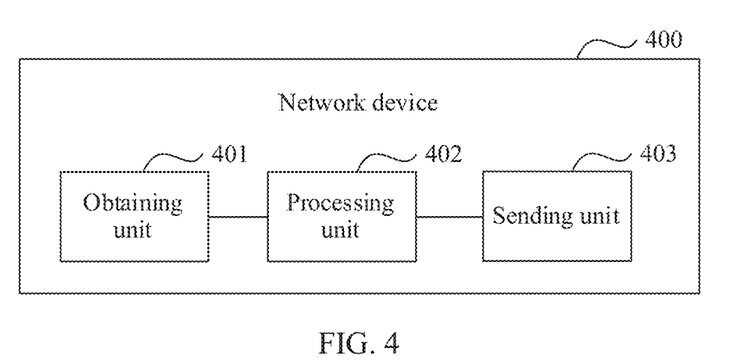
FIG. 4 is a schematic structural diagram of a network device according to an embodiment of the present disclosure.

FIG. 4 shows a possible schematic structural diagram of a network device in the foregoing embodiments. A network device 400 may implement a function of an ingress node of a measurement domain for a first packet flow in the foregoing embodiments. Further, the network device 400 may implement a function of the network device 201 shown in FIG. 2 or a function of the network device 301 shown in FIG. 3. Refer to FIG. 4. The network device 400 includes an obtaining unit 401, a processing unit 402, and a sending unit 403. These units may perform a corresponding function of the ingress node of the measurement domain for the first packet flow in the foregoing method examples, that is, a corresponding function of the node A shown in FIG. 1. For example, the obtaining unit 401 is configured to obtain reverse measurement indication information, where the reverse measurement indication information is used to indicate to measure a reverse packet flow of the first packet flow, the processing unit 402 is configured to add, after the first network device receives the first packet flow, the reverse measurement indication information to a first packet in the first packet flow, and the sending unit 403 is configured to send the first packet carrying the reverse measurement indication information.

Figure 5:
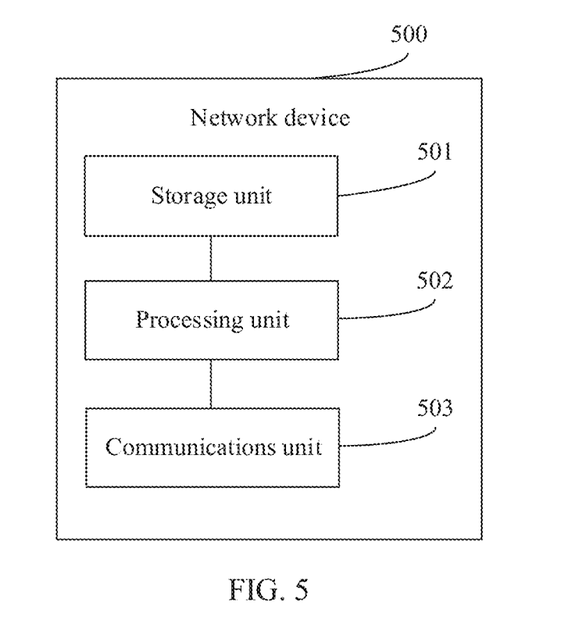
FIG. 5 is a schematic structural diagram of a network device according to an embodiment of the present disclosure.

When an integrated unit is used, FIG. 5 shows another possible schematic structural diagram of an ingress node of a measurement domain for a first packet flow in the foregoing embodiments. A network device 500 may also implement a function of the network device 201 shown in FIG. 2 or a function of the network device 301 shown in FIG. 3.

The network node 500 includes a storage unit 501, a processing unit 502, and a communications unit 503. The processing unit 502 is configured to control and manage an action of the network device 500. For example, the processing unit 502 is configured to support the network device 500 to perform the processes S210 and S211 in FIG. 2, and processes S310 and S311 in FIG. 3, and/or another process used for the technology described in this specification. The communications unit 503 is configured to support communication between the network device 500 and another network entity, for example, communication with another node in the measurement domain for the first packet flow. The storage unit 501 is configured to store program code and data of the network device 500.

The processing unit 502 may be a processor, such as may be a central processing unit (CPU), a general-purpose processor, a digital signal processor (DSP), an application-specific integrated circuit (ASIC), a field-programmable gate array (FPGA), or another programmable logic device, a transistor logic device, a hardware component, or any combination thereof. The controller/processor may implement or execute various example logical blocks, modules, and circuits described with reference to content disclosed in the embodiments of the present disclosure. The processor may be a combination of processors implementing a computing function, for example, a combination of one or more microprocessors, or a combination of the DSP and a microprocessor. The communications unit 503 may be a network interface, and the storage unit 501 may be a memory.

Figure 6:
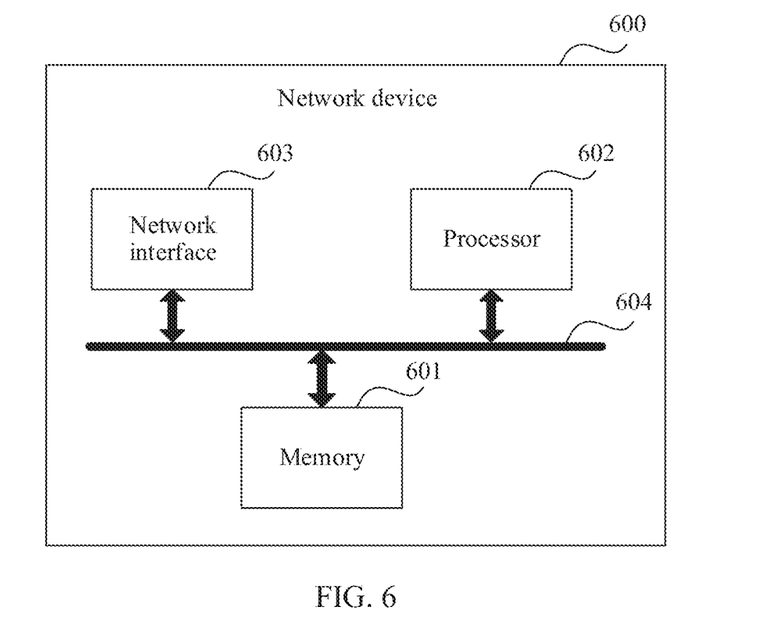
FIG. 6 is a schematic structural diagram of a network device according to an embodiment of the present disclosure.

When the processing unit 502 is the processor, the communications unit 503 is the communications interface, and the storage unit 501 is the memory, the network device in the embodiments of the present disclosure may be a network device 600 shown in FIG. 6.

Refer to FIG. 6. FIG. 6 shows another possible schematic structural diagram of an ingress node of a measurement domain for a first packet flow in the foregoing embodiments. The network device 600 includes a processor 602, a network interface 603, a memory 601, and a bus 604.

The memory 601 is configured to store instructions. When the embodiment shown in FIG. 4 is implemented and units described in the embodiment in FIG. 4 are implemented by using software, software or program code required for performing functions of the obtaining unit 401, the processing unit 402, and the sending unit 403 in FIG. 4 is stored in the memory 601.

The processor 602 is configured to execute the instructions in the memory 601, so as to perform the packet measurement method applied to the network device 201 in the embodiment shown in FIG. 2 or the packet measurement method applied to the network device 301 in the embodiment shown in FIG. 3.

The communications interface 603 is configured to communicate.

The network interface 602 may include a common physical interface, and the physical interface may be an Ethernet interface or an asynchronous transfer mode (ATM) interface. A network interface 603, the processor 602, and the memory 601 are interconnected by using the bus 604. The bus 604 may be a peripheral component interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 6, but this does not mean that there is only one bus or only one type of bus.

In an example, the processor 602, the network interface 603, and the memory 601 may be integrated into one or more independent circuits or one or more pieces of hardware, for example, an ASIC.

Figure 7:
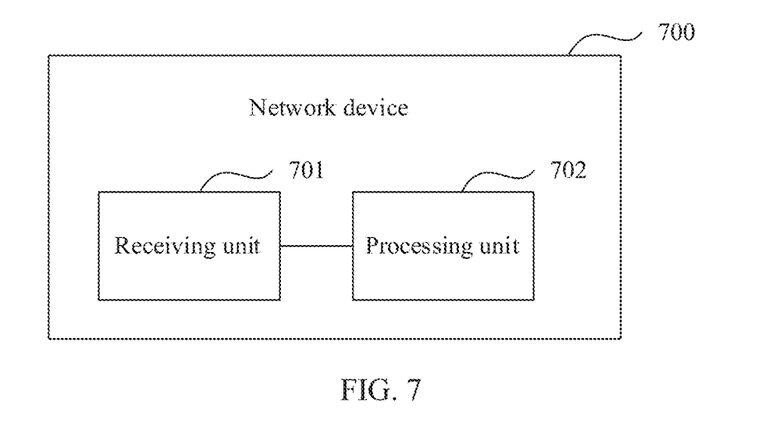
FIG. 7 is a schematic structural diagram of another network device according to an embodiment of the present disclosure.

FIG. 7 shows a possible schematic structural diagram of a network device in the foregoing embodiments. A network device 700 may implement a function of an egress node of a measurement domain for a first packet flow in the foregoing embodiments. Further, the network device 700 may implement a function of the network device 202 shown in FIG. 2 or a function of the network device 303 shown in FIG. 3. Refer to FIG. 7. The network device 700 includes a receiving unit 701 and a processing unit 702. These units may perform a corresponding function of the egress node of the measurement domain for the first packet flow in the foregoing method examples, that is, a corresponding function of the node E shown in FIG. 1. For example, the receiving unit 701 is configured to receive the first packet flow, where a first packet in the first packet flow includes reverse measurement indication information, and the processing unit 702 is configured to measure a second packet flow based on an indication of the reverse measurement indication information, where the second packet flow is a reverse packet flow of the first packet flow.

Figure 8:
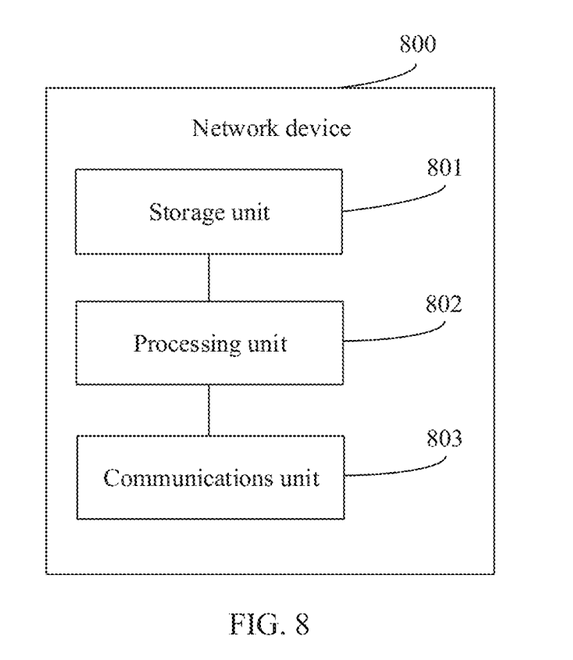
FIG. 8 is a schematic structural diagram of another network device according to an embodiment of the present disclosure.

When an integrated unit is used, FIG. 8 shows another possible schematic structural diagram of an egress node of a measurement domain for a first packet flow in the foregoing embodiments. A network device 800 may also implement a function of the network device 202 shown in FIG. 2 or a function of the network device 303 shown in FIG. 3.

The network node 800 includes a storage unit 801, a processing unit 802, and a communications unit 803. The processing unit 802 is configured to control and manage an action of the network device 800. For example, the processing unit 802 is configured to support the network device 800 to perform the processes S214 in FIG. 2, and processes S317, S320, S321, and S322 in FIG. 3, and/or another process used for the technology described in this specification. The communications unit 803 is configured to support communication between the network device 800 and another network entity, for example, communication with another node in the measurement domain for the first packet flow. The storage unit 801 is configured to store program code and data of the network device 800.

The processing unit 802 may be a processor, such as may be a CPU, a general-purpose processor, a DSP, an ASIC, an FPGA, or another programmable logic device, a transistor logic device, a hardware component, or any combination thereof. The controller/processor may implement or execute various example logical blocks, modules, and circuits described with reference to content disclosed in the embodiments of the present disclosure. The processor may be a combination of processors implementing a computing function, for example, a combination of one or more microprocessors, or a combination of the DSP and a microprocessor. The communications unit 803 may be a network interface, and the storage unit 801 may be a memory.

Figure 9:
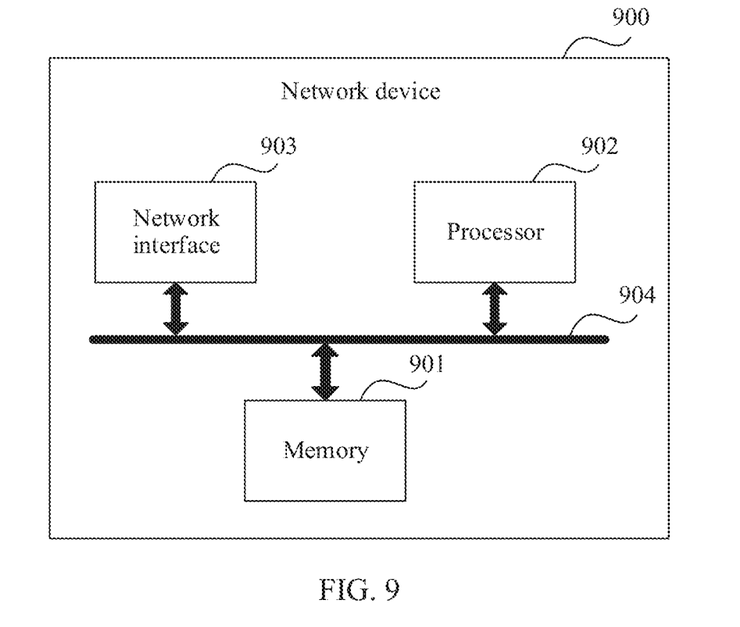
FIG. 9 is a schematic structural diagram of another network device according to an embodiment of the present disclosure.

When the processing unit 802 is the processor, the communications unit 803 is the communications interface, and the storage unit 801 is the memory, the network device in the embodiments of the present disclosure may be a network device 900 shown in FIG. 9.

Refer to FIG. 9. FIG. 9 shows another possible schematic structural diagram of an egress node of a measurement domain for a first packet flow in the foregoing embodiments. The network device 900 includes a processor 902, a network interface 903, a memory 901, and a bus 904.

The memory 901 is configured to store instructions. When the embodiment shown in FIG. 7 is implemented and units described in the embodiment in FIG. 7 are implemented by using software, software or program code required for performing functions of the receiving unit 701, and the sending unit 702 in FIG. 7 is stored in the memory 901.

The processor 902 is configured to execute the instructions in the memory 901, so as to perform the packet measurement method applied to the network device 202 in the embodiment shown in FIG. 2 or the packet measurement method applied to the network device 303 in the embodiment shown in FIG. 3.

The communications interface 903 is configured to communicate.

The network interface 902 may include a common physical interface, and the physical interface may be an Ethernet interface or an ATM interface. A network interface 903, the processor 902, and the storage 901 are interconnected by using the bus 904. The bus 904 may be a PCI bus, an EISA bus, or the like. The bus may be classified into an address bus, a data bus, a control bus, and the like. For ease of representation, only one thick line is used to represent the bus in FIG. 9, but this does not mean that there is only one bus or only one type of bus.

In an example, the processor 901, the network interface 902, and the memory 903 may be integrated into one or more independent circuits or one or more pieces of hardware, for example, an ASIC.

In addition, an embodiment of this application further provides a communications system. The communications system includes a first network device and a second network device. The first network device in the network system may perform a processing step of the network device 201 in FIG. 2 or a processing step of the network device 301 in FIG. 3, and the second network device in the network system may perform a processing step of the network device 202 in FIG. 2 or a processing step of the network device 303 in FIG. 3. Correspondingly, the first network device in the network system may be the network device 400 in the embodiment shown in FIG. 4, and the second network device in the network system may be the network device 700 in the embodiment shown in FIG. 7. Correspondingly, the first network device in the network system may be the network device 500 in the embodiment shown in FIG. 5, and the second network device in the network system may be the network device 800 in the embodiment shown in FIG. 8. Correspondingly, the first network device in the network system may be the network device 600 in the embodiment shown in FIG. 6, and the second network device in the network system may be the network device 900 in the embodiment shown in FIG. 9.

An embodiment of this application further provides a computer-readable storage medium, including instructions. When the instructions are run on a computer, the computer is enabled to perform the packet measurement method applied to the network device 400 in the embodiment shown in FIG. 4, the network device 500 in the embodiment shown in FIG. 5, or the network device 600 in the embodiment shown in FIG. 6.

An embodiment of this application further provides a computer-readable storage medium, including instructions. When the instructions are run on a computer, the computer is enabled to perform the packet measurement method applied to the network device 700 in the embodiment shown in FIG. 7, the network device 800 in the embodiment shown in FIG. 8, or the network device 900 in the embodiment shown in FIG. 9.

An embodiment of this application further provides a computer program product including computer program instructions. When the computer program product is run on a network device, the network device is enabled to perform the methods in the foregoing method embodiments.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

It may be clearly understood by a person skilled in the art that, for the purpose of convenient and brief description, for a detailed working process of the foregoing system, apparatus, and unit, refer to a corresponding process in the foregoing method embodiments.

In the several embodiments provided in this application, it should be understood that the disclosed system, apparatus, and method may be implemented in other manners. For example, the described apparatus embodiments are merely examples. For example, unit division is merely logical service division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, service units in the embodiments of this application may be integrated into one processing unit, or each of the units may exist alone physically, or two or more units are integrated into one unit. The foregoing integrated unit may be implemented in a form of hardware, or may be implemented in a form of a software service unit.

When the integrated unit is implemented in the form of the software service unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

A person skilled in the art should be aware that in the foregoing one or more examples, services described in the present disclosure may be implemented by hardware, software, firmware, or any combination thereof. When the present disclosure is implemented by software, the services may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the present disclosure are further described in detail. It should be understood that the foregoing descriptions are merely specific implementations of the present disclosure.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A network device comprising:
a first port and a second port;
one or more processors; and
a memory coupled to the one or more processors and configured to store instructions, wherein the instructions, when executed by the one or more processors, cause the network device to:
receive, at the first port, a first packet flow comprising a packet;
add, at the first port, an identifier of the first packet flow to the packet;
identify, at the second port, the packet based on the identifier;
measure, at the second port, the packet as part of the first packet flow;
add a reverse measurement indication information to the packet, wherein the reverse measurement indication information indicates a first request to an out point of an in-band flow measurement path of the first packet flow to perform an in-band flow measurement on a reverse packet flow of the first packet flow; and
send the packet carrying the reverse measurement indication information along a forwarding path of the first packet flow.

2. The network device of claim 1, wherein the instructions, when executed by the one or more processors, further cause the network device to:
receive control information from a controller; and
generate the reverse measurement indication information based on the control information.

3. The network device of claim 1, wherein the instructions, when executed by the one or more processors, further cause the network device to add the reverse measurement indication information and the identifier to a stack bottom label of a label stack of the packet at the second port.

4. The network device of claim 3, wherein the instructions, when executed by the one or more processors, further cause the network device to:
generate ingress statistical information based on a first measurement performed on the first packet flow at the first port;
generate egress statistical information based on a second measurement performed on the first packet flow at the second port; and
send the ingress statistical information and the egress statistical information to a controller.

5. The network device of claim 4, wherein the instructions, when executed by the one or more processors, further cause the network device to send the identifier and identification information of the network device to the controller, and wherein the identifier indicates a second request to the controller to calculate a measurement result of the first packet flow on the network device based on the ingress statistical information and the egress statistical information.

6. The network device of claim 1, wherein the instructions, when executed by the one or more processors, further cause the network device to:
generate ingress statistical information based on a first measurement performed on the first packet flow at the first port;
generate egress statistical information based on a second measurement performed on the first packet flow at the second port; and
send the ingress statistical information and the egress statistical information to a controller.

7. The network device of claim 6, wherein the instructions, when executed by the one or more processors, further cause the network device to send the identifier and identification information of the network device to the controller, and wherein the identifier indicates a second request to the controller to calculate a measurement result of the first packet flow on the network device based on the ingress statistical information and the egress statistical information.

8. The network device of claim 1, wherein the in-band flow measurement is an in-band flow information telemetry (IFIT).

9. A network device, applied to an out point of an in-band flow measurement path of a first packet flow, wherein the network device comprises:
a first port and a second port;
one or more processors; and
a memory coupled to the one or more processors and configured to store instructions, wherein the instructions, when executed by the one or more processors, cause the network device to:
receive the first packet flow comprising a first packet, wherein the first packet flow comprises reverse measurement indication information indicating a request to perform an in-band flow measurement on a reverse packet flow of the first packet flow;
receive, at the first port, a second packet flow comprising a second packet;
add, at the first port, a first identifier to the second packet in the second packet flow;
identify, at the second port, the second packet in the second packet flow based on the first identifier;
measure the second packet flow based on an indication of the reverse measurement indication information, wherein the second packet flow is the reverse packet flow of the first packet flow; and
send a second identifier of the second packet flow and identification information of the network device to a controller.

10. The network device of claim 9, wherein the instructions, when executed by the one or more processors, further cause the network device to
send, from the second port the second packet flow along a reverse path.

11. The network device of claim 10, wherein the instructions, when executed by the one or more processors, further cause the network device to:
identify the first packet in the first packet flow based on a third identifier of the first packet flow; and
measure the first packet as part of-the first packet flow.

12. The network device of claim 10, wherein the instructions, when executed by the one or more processors, further cause the network device to:
measure the second packet as part of the second packet flow.

13. The network device of claim 9, wherein the in-band flow measurement is an in-band flow information telemetry (IFIT).

14. A network system comprising a first network device and a second network device,
wherein the first network device is configured to:
receive, at a first port, a first packet flow comprising a packet;
add, at the first port, a first identifier of the first packet flow to the packet;

identify, at a second port, the packet based on the first identifier;

measure the packet as part of the first packet flow at the second port;

add a reverse measurement indication information to a packet in the first packet flow, wherein the reverse measurement indication information indicates a first request to the second network device in an in-band flow measurement path of the first packet flow to perform an in-band flow measurement on a reverse packet flow of the first packet flow; and send the packet carrying the reverse measurement indication information along a forwarding path of the first packet flow; and the second network device communicatively coupled to the first network device and configured to:

receive the first packet flow; and measure a second packet flow based on an indication of the reverse measurement indication information, wherein the second packet flow is a reverse packet flow of the first packet flow.

15. The network system of claim 14, wherein the first network device is further configured to send the first packet flow at the second port.

16. The network system of claim 14, further comprising a controller and wherein the first network device is further configured to:

receive control information from the controller; and generate the reverse measurement indication information based on the control information.

17. The network system of claim 16, wherein the controller is configured to determine a measurement domain of the in-band flow measurement path.

18. The network system of claim 14, wherein the first network device is further configured to add the reverse measurement indication information and the first identifier to a stack bottom label of a label stack of the packet at the second port.

19. The network system of claim 14, wherein the first network device is further configured to:

generate ingress statistical information based on a first measurement performed on the first packet flow at the first port;

generate egress statistical information based on a second measurement performed on the first packet flow at the second port; and send the ingress statistical information and the egress statistical information to a controller.

20. The network system of claim 14, wherein the in-band flow measurement is an in-band flow information telemetry (IFIT).

* * * * *